May 22, 1962 — H. THOMPSON — 3,035,707
LAZY SUSAN DEVICE

Filed Dec. 7, 1959 — 2 Sheets-Sheet 1

INVENTOR
HOWARD THOMPSON

ATTORNEY

May 22, 1962 H. THOMPSON 3,035,707
LAZY SUSAN DEVICE
Filed Dec. 7, 1959 2 Sheets-Sheet 2

INVENTOR
HOWARD THOMPSON
ATTORNEY

# United States Patent Office 3,035,707
Patented May 22, 1962

3,035,707
LAZY SUSAN DEVICE
Howard Thompson, 7520 Wayyota Blvd.,
Minneapolis, Minn.
Filed Dec. 7, 1959, Ser. No. 857,835
5 Claims. (Cl. 211—78)

This invention relates to improvements in food serving devices and more particularly to devices of the character known generally as Lazy Susans.

Food servers of this type now in use are manufactured with a varying number of trays in which the desired foods may be placed. The number of trays in any particular server is determined by the manufacturer, and the user of the device is unable to vary the number of trays to suit the different serving requirements which often arise. If, for example, the server has four serving trays equally spaced around the center post and only three different articles of food are to be served, the problem which presents itself becomes obvious. Placing food on only three of the bowls will shift the center of gravity, causing the server to become unstable when placed on a flat surface. This would cause some servers to tip immediately and others to tip when food is removed therefrom.

Another disadvantage of present day food servers arises when all of the serving trays are not used. The food server presents an awkward appearance and is not pleasing to the eye when placed upon a table. The user is forced either to supply some particular food commodity which is not desired to be served at the time or to leave one tray empty.

Accordingly it is an object of this invention to provide a food server in which the number of trays may be very easily and quickly varied by the user.

It is a further object to provide a server which will have a symmetrical and pleasing appearance at all times regardless of the number of trays used.

A still further object is to provide a server whose parts may be economically manufactured.

Another object of this invention is to provide a server which may be easily and quickly dismantled for purposes of shipping and additionally for the purpose of storing in small spaces by the user.

Yet another object is to provide apparatus having object holding devices, such as bowls or trays, the number of said devices being variable at the discretion of the user.

Other and further objects and advantages of the invention will be apparent from the following detailed description taken in conjunction with the accompanying drawings wherein a preferred embodiment of the principles of the invention has been selected for exemplification.

Figure 1:
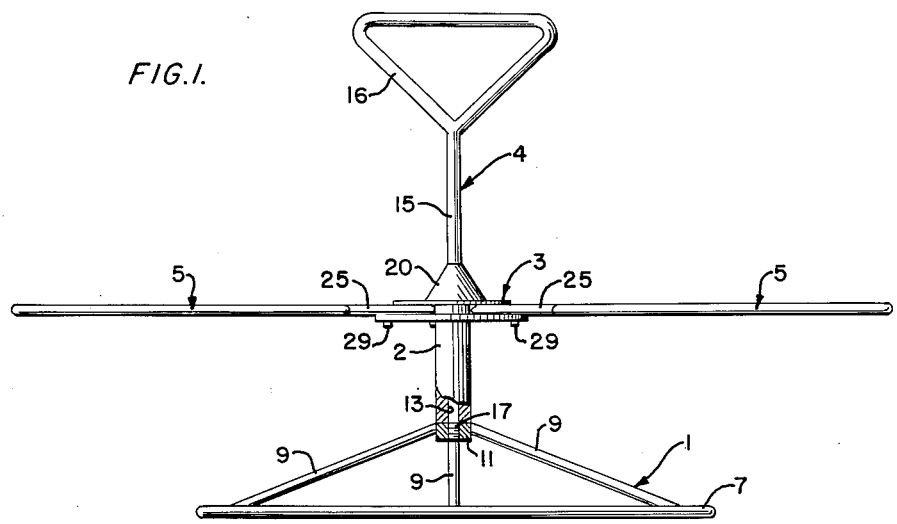
FIG. 1 is a side elevational view of the device constructed in accordance with the invention and assembled in an operative position.

Referring more particularly to the drawings, wherein like numerals refer to like parts, the device as illustrated comprises a circular base 1, a supporting shaft 2, tray holder support 3, carrying handle 4, and tray holders 5. The base 1 is an integrally formed member comprising ring 7, struts 9 and center piece 11 as shown. Center piece 11 is internally threaded. Support member 2 is cylindrical in shape having a decreased diameter at end 18 and has a circular opening 13 extending the length thereof, said opening being aligned with the threaded opening of center piece 11 when the server is assembled. Tray holder support 3 rests on support 2 and also has a center opening 41 drilled therethrough, the opening of member 3 being axially aligned with the opening in support member 2. The carrying member 4 is an integrally formed unit comprising a handle 16, a shaft 15, a shaft 17 and a flange 20 between shafts 15 and 17. Shaft 17 is threaded at its outer end. Thus it can be seen that exclusive of the trays the device consists of the base 1, the support shaft 2, the tray holder support 3 and the handle 4.

Figure 4:
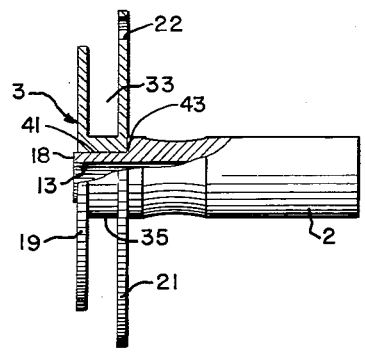
FIG. 4 is a partially sectional side elevational view of the support for the tray holders.

To assemble the device the opening of tray holder support 3 is placed over the end 18 of supporting shaft 2 so that disc 21 bears against shoulder 43 of the shaft as shown in FIG. 4. Then supporting shaft 2 is placed over shaft 17, end 18 of shaft 2 abutting against flange 20 of carrying member 4. Shaft 17 is then secured to the threaded portion of central member 11 of base 1. FIG. 4 shows a slightly exaggerated view of end 18 protruding beyond disc 19. Flange 20 bears upon end 18 when the device is assembled so that the tray holder support is free to rotate about supporting shaft 2.

Figure 2:
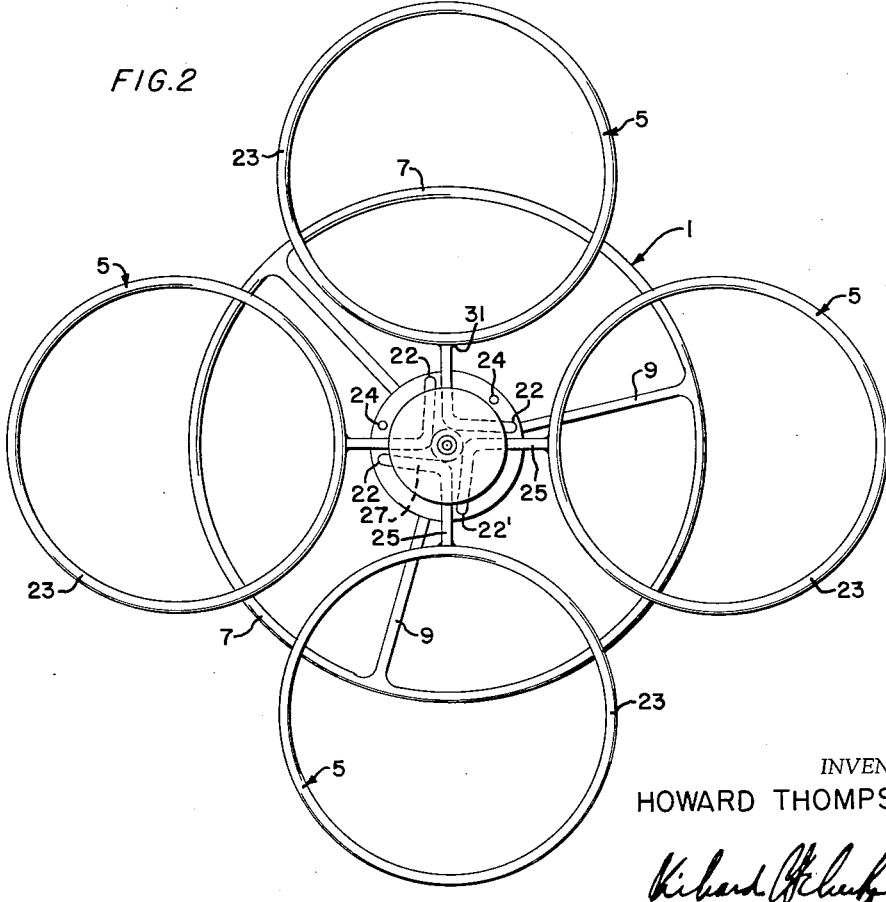
FIG. 2 is a plan view of the device shown in FIG. 1 with the carrying handle removed.
Figure 5:
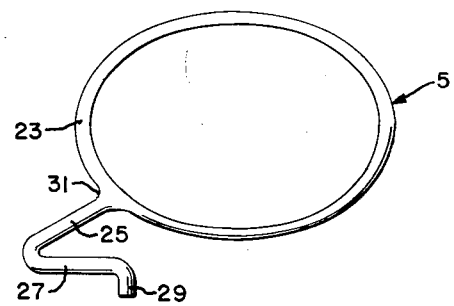
FIG. 5 is a perspective view of one of the tray holders.

Turning now to FIG. 2 wherein a plan view of FIG. 1 is shown with the handle removed for purposes of clarity, the server is shown with four tray holders in place and ready for use. Tray holder support 3 is comprised of two circular discs spaced apart in a parallel manner as is more clearly shown in FIGS. 3 and 4, the lower disc 21 having holes 22', 22 and 24 drilled therethrough near the outer edge. As shown in FIG. 2 holes 22', 22 and 24 are not covered by upper disc 19. Each tray holder 5 has a configuration as shown in FIG. 5 and comprises circular ring 23 with a shaft 25 extending therefrom. Shaft 25 is bent at an approximately 90° angle as shown so that portion 27 is substantially parallel to a tangential line extending through point 31 on ring 23. Shaft 27 is again bent approximately 90° forming short shaft 29. Thus, shaft 29 is substantially perpendicular to shaft 27 and parallel to the axis of ring 23. The shaft 27 is preferably circular in cross section, and has a diameter slightly greater than space 33 between discs 19 and 21. Tray holders 5 are placed in holder support 3 in the following manner. End portion 29 of tray holder 5 is placed in the desired hole such as hole 22 as shown in FIG. 2. The tray holder 5 is then rotated in a counterclockwise direction until shaft 27 bears against cylinder 35 which separates discs 19 and 21. Since the shaft 25 has a diameter which is slightly greater than the space 33 between discs 19 and 21, a compressive effect is exerted thereon by the discs and the tray holder is held firmly in place. All of the tray holders 5 are inserted in the holder 3 in the same manner and are easily removable by merely rotating a tray 5 in a clockwise direction until shaft 25 passes beyond disc 19 and then removing shaft 29 from the hole.

Figure 6:
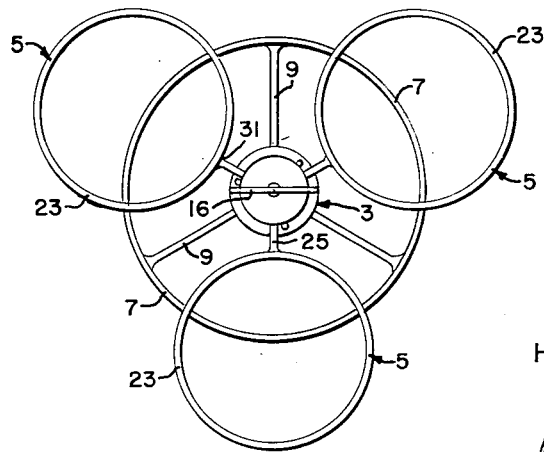
FIG. 6 is a view similar to FIG. 1 but showing the device assembled for use with three trays.

As can be seen by comparison of FIGS. 2 and 6 the number of tray holders to be used is variable. The illustration used herein and shown in the drawings discloses a server wherein either three or four tray holders may be used, and in either case they will be equally spaced so as to attain proper balance of the server and at the same time give a symmetrical appearance which is pleasing to the eye. This variability is attained by properly spacing the holes 22', 22 and 24 in disc 33. Holes 22' and 22 are equally spaced around disc 21, the spacing between these holes being subtended by a 90° arc. Since all of the tray holders 5 are alike it can be seen that the use of four of these trays with their shafts 29 placed in holes 22 will result in the tray holders having an equidistant separation of 90 circular degrees. Hole 22' and holes 24 are equally spaced around disc 21 so that the distance between these holes is subtended by an arc of 120°. These are the holes used when only three tray holders are desired. The three tray assembly is illustrated in FIG. 6. The shaft 29 of tray holder 5 is placed in hole 22' and the shafts 29 of the other two tray holders 5 are placed in holes 24. Thus, when the tray holders are secured into their final position, the three trays will be equally spaced 120° apart.

Figure 3:
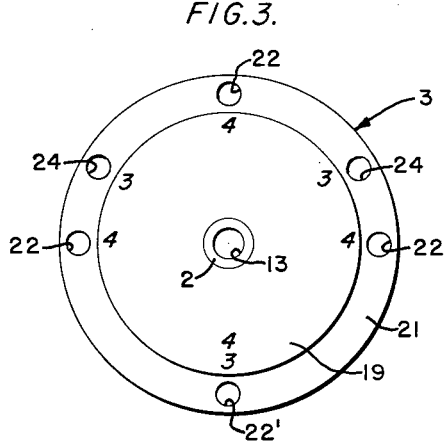
FIG. 3 is a plan view of the support for the tray holders.

In order that the user of this serving device may quickly and easily assemble it for the desired use, number indicia may appear on the top of disc 19 as shown in FIG. 3. The number "3" indicates which holes are to be used when the three tray assembly is desired and the number "4" indicates which holes are to be used when the four tray assembly is desired. It will be noted that hole 22' is used in both assemblies and is so indicated by the indicia numbers "3" and "4."

It may now be seen that any number of tray holders could be used with such a device by merely having a greater number of holes around the circumference of disc 21. The number of tray holders used would be limited only by their size, the use of a greater number requiring that the trays themselves be of a smaller diameter.

It is further noted that the use of such a balanced device as shown herein is not in fact limited to a food server or even to a tray holder. It could also be used as a device from which articles could be hung, for instance, in which case the circular holder would not be used, the shaft 25 merely ending in some type of hanger device.

Accordingly, it is to be understood that the principles of the present invention are not confined to the particular construction and configuration of the parts as herein illustrated and described but embrace all such modifications thereof as come within the scope of the following claims.

I claim:

1. A receptacle support comprising a base, a center shaft removably attached to said base, a circular member comprising two integral parallel discs spaced apart by a centrally located hollow cylinder through which said center shaft passes, means for supporting said circular member above said base and a plurality of receptacle supporting members having formed shafts, said shafts being removably sustained between said discs.

2. The apparatus of claim 1 wherein said discs are of dissimilar diameters, said larger disc having a plurality of sets of circumferentially spaced apertures near the outer edge thereof for engagement with the outer ends of said shafts.

3. The apparatus of claim 2 wherein the number of apertures per set differs in each set and the apertures of each individual set are equidistantly spaced around the circumference of said disc.

4. A food server comprising a base having an internally threaded center piece, a center shaft removably secured to said center piece and having a flange thereon, a circular member comprising two parallel discs of dissimilar diameters spaced apart by a centrally located cylinder through which said center shaft passes, the larger of said discs having a pluralty of sets of circumferentially spaced apertures near the outer edge thereof, a plurality of tray holders having formed shafts removably attached to said circular member, said holder shafts passing between said discs and selectively engaging the apertures in the larger of said discs, and a hollow support through which said center shaft passes, one end of said support abutting against said larger disc and the other end of said support abutting against said center piece.

5. The apparatus of claim 4 wherein the number of apertures per set differs in each set and the apertures of each individual set are equally spaced around the circumference of said larger disc.

References Cited in the file of this patent

UNITED STATES PATENTS

| 113,035 | Erkson | Mar. 28, 1871 |
| 233,170 | Starr | Oct. 12, 1880 |
| 409,154 | Kintz | Aug. 13, 1889 |
| 924,550 | Hall | June 8, 1909 |
| 1,162,290 | Koken | Nov. 30, 1915 |
| 1,837,362 | Golson | Dec. 22, 1931 |
| 2,281,849 | McCoppin | May 5, 1942 |
| 2,612,424 | Hochalter | Sept. 30, 1952 |
| 2,672,741 | Bernhardt | Mar. 23, 1954 |

FOREIGN PATENTS

| 16,927 | Great Britain | 1905 |